(12) United States Patent
Dickinson et al.

(10) Patent No.: US 6,487,631 B2
(45) Date of Patent: Nov. 26, 2002

(54) CIRCUIT AND METHOD FOR MONITORING SECTOR TRANSFERS TO AND FROM STORAGE MEDIUM

(75) Inventors: Gary S. Dickinson, Yorba Linda, CA (US); William W. Dennin, Lake Forest, CA (US)

(73) Assignee: QLogic Corporation, Aliso Viejo, CA (US)

( * ) Notice: Subject to any disclaimer, the term of this patent is extended or adjusted under 35 U.S.C. 154(b) by 0 days.

(21) Appl. No.: 09/243,295

(22) Filed: Feb. 2, 1999

(65) Prior Publication Data

US 2002/0069321 A1 Jun. 6, 2002

(51) Int. Cl.⁷ .......................... G06F 12/00; G06F 13/00
(52) U.S. Cl. .......................... 711/112; 710/29; 710/34; 710/36
(58) Field of Search .......................... 711/112; 710/29, 710/34, 36, 263, 264

(56) References Cited

U.S. PATENT DOCUMENTS

| | | | | |
|---|---|---|---|---|
| 4,603,382 A | * | 7/1986 | Cole et al. .................. | 364/200 |
| 5,249,271 A | * | 9/1993 | Hopkinson et al. ......... | 395/250 |
| 5,276,662 A | | 1/1994 | Shaver, Jr. et al. | |
| 5,361,267 A | * | 11/1994 | Godiwala et al. .......... | 371/40.1 |
| 5,640,602 A | * | 6/1997 | Takase ........................ | 710/35 |
| 6,134,063 A | * | 10/2000 | Weston-Lewis et al. ...... | 360/49 |
| 6,157,984 A | * | 12/2000 | Fisher et al. ................. | 711/112 |

* cited by examiner

*Primary Examiner*—Matthew Kim
*Assistant Examiner*—Pierre M. Vitel
(74) *Attorney, Agent, or Firm*—Tejinder Singh; Klein, O'Neill & Singh LLP

(57) ABSTRACT

In a controller integrated circuit, which controls the operation of a peripheral storage device, a transfer monitoring circuit that facilitates the monitoring of successful transfers from outside the controller integrated circuit. The circuit includes a counter circuit that counts the number of successful transfers, a value storing register, a comparison circuit to compare the counter value to the value stored in the register and generate a result. The transfer monitoring circuit speeds up the operation of the controller integrated circuit especially during recovery from error conditions. The monitoring circuit also allows for a more optimal use of a look-ahead cache.

16 Claims, 2 Drawing Sheets

CIRCUIT AND METHOD FOR MONITORING SECTOR TRANSFERS TO AND FROM STORAGE MEDIUM

FIELD OF THE INVENTION

The present invention relates generally to peripheral storage devices and, more particularly, to techniques for monitoring the transfer of data between a host system and a hard disk drive or other peripheral storage device.

BACKGROUND OF THE INVENTION

Computer systems commonly include one or more peripheral storage devices that are used to store and/or provide access to data. One common type of peripheral storage device is a hard disk drive. Other types of peripheral storage devices include tape drives, CD drives (both read-only and read/write), and DVD devices.

The most basic parts of a hard disk drive include at least one platter or "disk" that is rotated, an actuator that moves a transducer to various locations over the disk, and electrical circuitry that is used to write and read data to and from the disk. The disk drive also includes circuitry for encoding data so that data can be successfully retrieved from and written to the disk surface. The circuitry for encoding the data and circuitry that is used to perform the read and write operations on the disk are usually in a controller. The controller can be made as an integrated circuit placed within the hard disk drive. A disk drive microprocessor ("microprocessor") can be either embedded within or external to the controller integrated circuit.

The microprocessor controls most of the operations of the disk drive by configuring and monitoring the operation of the controller. For example, a host computer can initiate an operation by sending the controller a read command. The microprocessor recognizes the command and sets up registers in the controller to perform the read operation. The data is then read from the disk into a buffer. When a minimum amount of data is in the buffer the microprocessor sets up the controller to send the data from the buffer to the host.

Data is commonly read from or written onto the hard disk using a parallel processing scheme. The parallel processing method allows the disk controller to simultaneously read data, check for errors, and correct errors. This parallel processing is sometimes referred to as pipelining. For example, while one sector is read by a module, a second sector can be error checked by another module, and a third sector can be corrected in a third module. It can be seen that, with a parallel writing and reading method, several different operations on different sectors can take place at the same time. If an error is detected by any of the operations, it can be difficult and time consuming to determine which sector generated the error condition. Algorithms and decision trees are sometimes used to track the propagation of sectors through the error detection units to determine which sector is operated on at any given time. The processing power required to keep track of the sectors in such a pipelining reading and writing scheme slows down the operation of the disk drive. Therefore it would be an advantage over prior disk drive systems to enable a disk drive to determine which data has been properly read or written without using complicated algorithms.

Certain unique problems are encountered when a disk drive system employs look ahead caching to speed up the transfer of data from the disk to the buffer. Look ahead caching is a method that uses the observation that once a sector is read it is likely that the sectors following it will also be read, since data is usually stored and read in sequential order. Therefore, when a request for a sector read is made, the look ahead cache will read additional sectors following the requested sector up to a certain number of sectors depending on the size of the cache. In this manner, requests for reading sectors that follow the first sector read will be processed by accessing the cache, thereby providing a shorter seek time for disk read operations. A complication arises when the disk controller receives a read request for a sector that is out of sequence with the earlier sectors. At this time, instead of transferring data from the cache, the data will have to be read from the physical media since the requested sector was not read into the cache. The microprocessor has to interrupt the reading of the sequential sectors into the cache and setup the controller to access the requested sector area on the physical media. If the next request following the out of order sector request is again within the sequence, the microprocessor commonly does not have any way of knowing whether the sector has been read into the cache. Instead of servicing the request from the cache, the microprocessor will have to set up the controller to access the data on the physical media to ensure data integrity. Therefore, it would be an improvement over prior systems for the microprocessor to be able to easily and rapidly determine how many sectors were properly read during an operation to prevent the microprocessor from reading the same sector twice.

SUMMARY OF THE INVENTION

The present invention overcomes the above problems by providing a tracking circuit that allows the microprocessor to efficiently monitor the number of successful sector transfers. The circuit is preferably incorporated within a disk drive controller. The circuit includes a counter that monitors the number of successful sector transfers during the present disk access. In a preferred embodiment, a successful transfer during a read operation is defined as a successful application of all error correction protocols for the sector, or data segment, transferred; and a successful transfer during a write operation is defined as the successful placement of a sector, or data segment, on the physical disk platter. The circuit also includes a programmable target register that can be programmed by the microprocessor with a target value for the number of sectors transferred. A comparator is used to compare the value from the counter to that in the target register. When the number of requested sector transfers has taken place, the comparator output is used to notify the processor that the target has been reached. The result of the comparison can be communicated to the microprocessor by, for example, an interrupt or a bit that is set in a microprocessor readable register. The microprocessor may additionally or alternatively be permitted to directly read the contents of the counter or write values to the counter.

The method of the present invention includes the steps of, on a disk access sequence, tracking successful transfers of sectors to the disk and to the buffer, incrementing a counter when a sector is successfully transferred, comparing the output of the counter to a value from a programmable register, and generating a result bit from the comparator.

The present invention provides the ability to track the number of completed sector transfers to ensure that the operation has completed successfully before the data can be further manipulated or extracted. The method of the present invention provides the advantage of allowing the microprocessor to efficiently determine, when an error condition arises, how many sectors have been read or written successfully, thereby eliminating the need to reinitiate the entire disk access sequence. The method of the present invention also enables the microprocessor to determine how many sectors were read into a look ahead cache, thereby providing for a better use of the cache.

In one embodiment, the present invention offers the additional advantage of allowing the microprocessor to read the output of the sector counter directly. Further, the microprocessor can also change the value in the target register once a target is reached to set a new target value. In the alternative, multiple programmable registers can be provided within the tracking circuit to allow the microprocessor to trace several points during the transfer of sectors. The present invention also increases data reliability by generating the successful sector read/write signal only once the data is actually available on the proper unit for reading or writing.

Although the invention is preferably embodied within a hard disk controller, it will be appreciated that the invention can be used within controllers of other types of peripheral storage devices, including tape drives, flash memory drives, and optical drives.

BRIEF DESCRIPTION OF THE DRAWINGS

The foregoing features and other features of the present invention will now be described with reference to the drawings of a preferred embodiment of a disk drive. In the drawings, the same components have the same reference numerals. The illustrated embodiment is intended to illustrate, but not to limit the invention. The drawings include the following figures.

DETAILED DESCRIPTION OF THE PREFERRED EMBODIMENT

Figure 1:
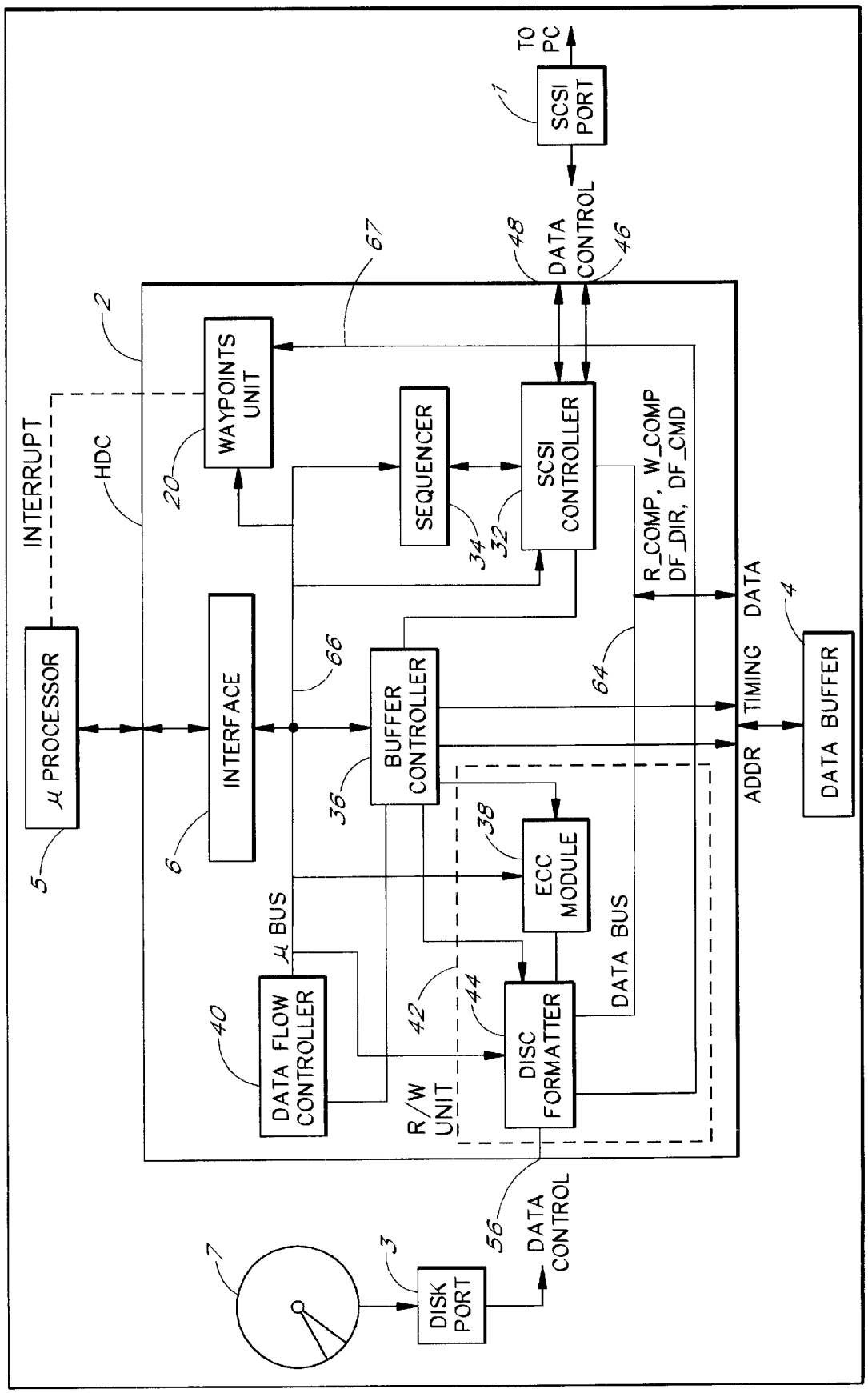
FIG. 1 is a block diagram of a disk drive which embodies the present invention.

To facilitate an understanding of the preferred embodiment, the general architecture and operation of a disk drive will initially be described. The specific architecture and operation of the preferred embodiment will then be described with reference to the general architecture and operation of a disk drive. The disk drive of FIG. 1 is an example of an internal (hard) disk drive included in a computer system. The host computer and the disk drive communicate and transfer data via a port 1, which is connected to a data bus (not shown). In an alternate embodiment (not shown), the disk drive is an external disk drive which is connected to a computer via a data bus. The data bus, for example, is a bus in accordance with a Small Computer System Interface (SCSI) specification. Those skilled in the art will appreciate that other communication buses known in the art can be used to transfer data between the disk drive and the computer.

As depicted in FIG. 1, the disk drive includes a controller 2 which is coupled to a SCSI port 1, a disk port 3, a data buffer 4, and a microprocessor 5. The interface 6 serves a to connect the microprocessor bus 66 to the microprocessor 5, for example, an INTEL 80186 or 80188 microprocessor. A ROM which is used to store firmware code executed by the microprocessor is omitted from the drawing. The disk port 3 couples the controller 2 to one or more platters 7, referred to collectively herein as the "disk."

As is standard in the industry, data is stored on the disk 7 in sectors. Each sector is byte structured and is made up of several fields, referred to as the sector format. For example, a typical sector format includes a logical block address (LBA) of about four bytes followed by a data field of about 512 bytes. The LBA contains position information, for example, cylinder, head and sector numbers. The data field is typically followed by a field for a cyclic redundancy code (CRC) checksum of about 2–4 bytes. A subsequent field for a number of error correction code (ECC) bytes, for example 24–40 bytes, is located at the end of the sector.

The controller 2 can be a controller integrated circuit (IC) that comprises several functional modules which provide for the writing and reading of disk data. The controller 2 is connected to a SCSI port 1 for a connection to the SCSI bus and a disk port 3 for a connection to the disk 7. The microprocessor 5 is coupled to the controller 2 via an interface 6 to facilitate the transfer of data, address, timing, and control information. The data buffer 4 is coupled to the controller 2 via ports to facilitate the transfer of data, timing, and address information. The interface 6 is connected to a microprocessor bus 66 to which several modules are connected. A data flow controller 40 is connected to the microprocessor bus 66 and to the buffer controller 36. An ECC module 38 and a disk formatter 44 are both connected to the microprocessor bus 66 and to the buffer controller 36. The disk formatter 44 is additionally connected to a data and control port 56 and to the data bus 64. A sequencer 34 and a SCSI controller 32 are connected to the microprocessor bus 66 and to one another. The SCSI controller 32 is further connected to the buffer controller 36 and to the data bus 64. The SCSI controller 32 receives data and control signals from ports 48, and 46, respectively. The waypoints unit 20 is connected to the microprocessor bus 66, and the disk formatter 44. The waypoints unit 20 is used to inform the microprocessor of the number of successful sector transfers during a read or write operation.

The SCSI controller 32 consists primarily of programmable registers and state machine sequencers that interface to the SCSI port 1 on one side and to a fast, buffered direct memory access (DMA) channel on the other side.

The sequencer 34 supports customized SCSI sequences, for example, by means of a 256-location instruction memory that allows users to customize command automation features. The sequencer 34 is organized in accordance with the Harvard architecture which has separate instruction and data memories. The sequencer 34 includes, for example, a 32-byte register file, a five-level deep stack, an integer algorithmic logic unit (ALU) and other special purpose units. The sequencer 34 supports firmware and hardware interrupt schemes. The firmware interrupt allows the microprocessor 5 to initiate an operation within the sequencer 34 without stopping the sequencer operation. A firmware interrupt vector can be modified by the microprocessor 5 while a program in the sequencer 34 is running. The hardware interrupt comes directly from the SCSI controller 32. The sequencer 34 can be configured to deliver these interrupts to the microprocessor 5 or to intercept these interrupts and act on them as part of a command automation.

The disk formatter 44 is a disk interface controller. The disk read/write unit 42 includes the disk formatter 44, a data memory (not shown), an ECC module 38 and a writable control store (WCS) state machine (not shown). The disk formatter 44 primarily performs control operations when the microprocessor 5 loads all required control information and parameter values into a WCS RAM and issues a command. The disk formatter 44 can automatically execute the command with no further intervention from the microprocessor 5.

The buffer controller 36 can be a four-channel, high-speed DMA controller. The buffer controller 36 regulates all data transfers into and out of the data buffer 1. The buffer controller 36 connects the data buffer 1, i.e., an output of its extended data out (EDO) DRAM, to a disk channel (disk formatter 44), to an ECC channel (ECC module 38), a SCSI channel (SCSI controller 32), and the microcontroller bus 66.

Within the buffer controller 36, the DMA controller controls several DMA channels. Each DMA channel has associated control, configuration and buffer memory address registers. Communications with the disk and the SCSI bus occurs via disk channels and SCSI channels each having a 32-word deep first-in-first-out (FIFO) memory. The buffer controller 36 also provides priority arbitration for buffer resources, buffer cyclical redundancy check (BCRC), and automatic refresh control for the DRAM.

The data flow controller 40 serves to reduce data transfer time between the disk and the controller 2 by automatically monitoring and controlling the flow of data between the disk and the SCSI channels. This control is accomplished by reducing the number of interrupts that occur in a typical disk-to-SCSI bus data transfer. When the disk and the SCSI bus data transfer rates are the same, both channels transfer data at the maximum rate which prevents slipped sectors in the disk port 3 and periods of inactivity during a data phase of a SCSI bus transfer.

The data flow controller 40 automatically prevents an overflow of the buffer 4, as well as an underflow of the buffer 4 by temporarily suspending the disk formatter 44 or the SCSI controller 32 before the buffer 4 becomes full or empty. The disk formatter 44 is suspended on sector boundaries, and the SCSI controller 32 is suspended only on SCSI block boundaries.

Figure 2:
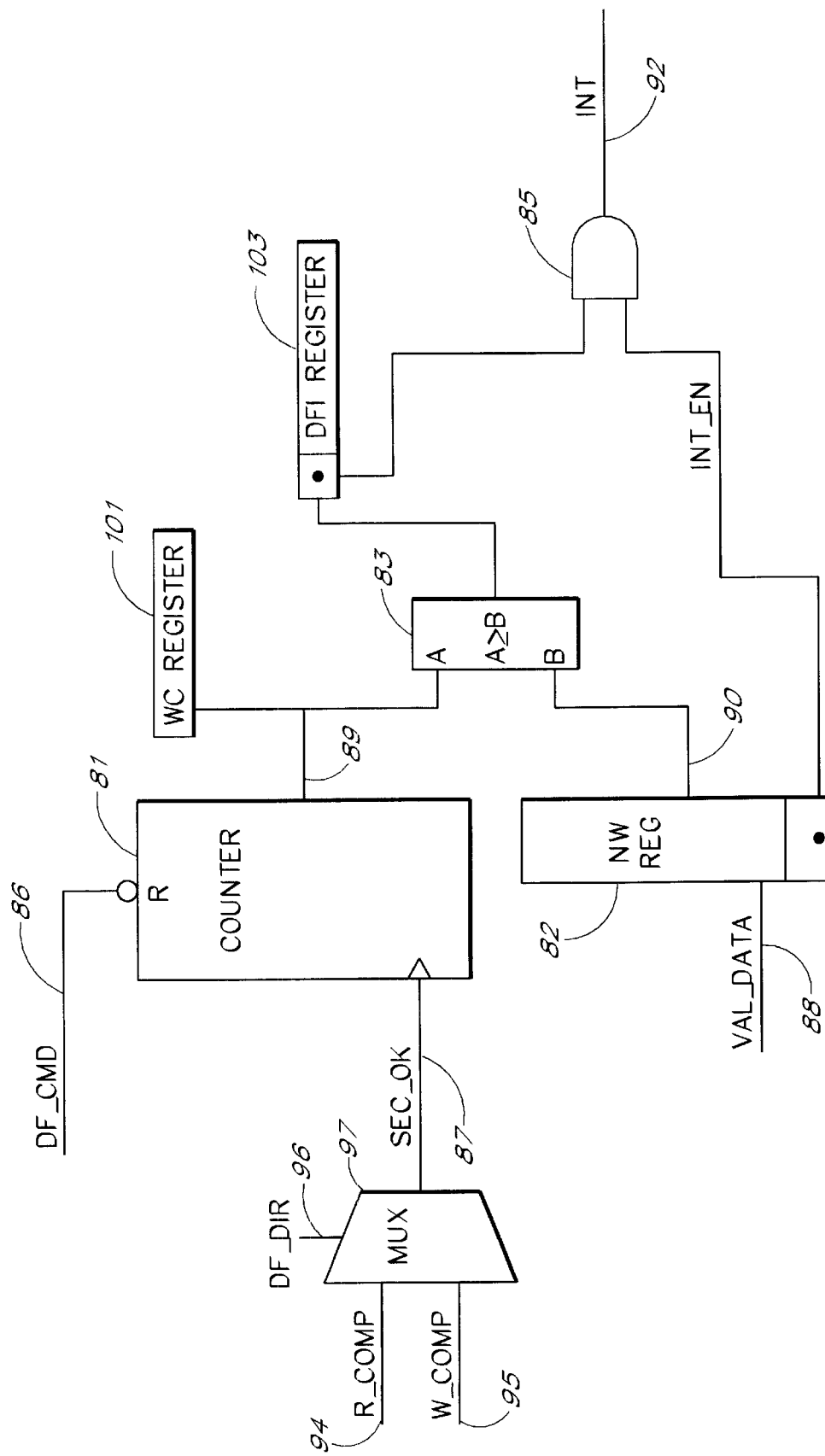
FIG. 2 is a block diagram of a counting module included in the disk controller of FIG. 1.

FIG. 2 is a more detailed representation of the waypoints unit 20 of FIG. 1. With Reference to both FIG. 1 and FIG. 2, the waypoints unit 20 will be more particularly described. The waypoints unit 20 receives a Disk Formatting Command signal (DF_CMD), a Read Complete signal (R_COMP), a Write Complete signal (W_COMP), and a Disk Formatter Direction signal (DF_DIR) from the disk formatter 44. The R_COMP signal is asserted when the disk formatter 44 has performed all error detection and corrections for a sector and has passed the data to the data buffer 4. The disk formatter 44 asserts the W_COMP signal when the disk formatter has generated all correction codes for a sector and has written the sector to the disk 7. The waypoints unit 20 is connected to a Next Waypoint register (NW register) 82 that includes an interrupt enable bit (INT_EN) and a set of bits representing a Waypoint value (VAL_DATA). The microprocessor can access the counter value 89 by monitoring bits in a Waypoint Count register (WC register) 101. The microprocessor 5 can also monitor the single bit comparator by directly accessing a bit (TARGET_REACHED) in the DF Interrupt register (DFI register) 103. The TARGET_REACHED bit is set when the counter value exceeds the waypoint value. The microprocessor 5 can receive an interrupt signal that is generated by monitoring the TARGET_REACHED bit and the INT_EN bit.

With reference to FIG. 2, the waypoints unit includes a counter 81 having a reset input connected to the disk formatter DF_CMD signal line 86. The counter has a clock input connected to the output of a multiplexer 97 that generates a Sector OK signal (SEC_OK), and an output line 89 connected to an input of a comparator 83. The NW register 82 has an output line 90 connected to an input of a comparator 83. The multiplexer 97 has an input 94 to receive the R_COMP signal, an input 95 to receive the W_COMP signal, a select signal input 96 responsive to the DF_DIR signal, and an output 87 to transmit a SEC_OK signal. A comparator 83 has a first input connected to the counter output 89, a second input connected to the NW register output 90, and an output connected to a bit in the DFI register 103. The bit from the DFI register 103 is connected to an input of an AND gate 85. The AND gate 85 has a second input from the INT_EN bit of the NW register 82, and an output 92 to the microprocessor bus 66 INT signal.

The waypoints unit operates by responding to the assertion of either a write or read completion signal (R_COMP or W_COMP), thereby tracking the number of successful sector transfers. The counter 81 is reset when the DF_CMD signal is asserted. The DF_CMD signal is generated by the disk formatter 44 on an initiation of access to the disk 7. The DF_DIR signal is generated by the disk formatter 44 as an indicator of the direction of data transfer, and is used by the multiplexer 97 to select an active line to pass through to the counter 81. The counter 81 increments the count in response to a SEC_OK signal from the multiplexer 97 Therefore, for every successful read or write operation, depending on the direction of data transfer, the count in the counter 81 will be incremented.

The NW register 82 stores a target value that can be set by the microprocessor at any time. The comparator 83 compares the value from the counter 81 with the target value in the NW register 82. When the count value is equal to or beyond the target value in the NW register 82, the output 84 of the comparator 83 becomes active. The output 84 of the comparator 83 can be directly read by the microprocessor 5 by accessing the DFI register 103 where the TARGET_REACHED bit is set by the output. The result of the comparison can also be sent to the microprocessor 5 by generating an interrupt on a line 92. The microprocessor 5 can set the INT_EN bit in the NW register 82 if it wants to receive an interrupt when the target is reached. If the interrupt enable bit INT_EN is set when the count value reaches the target value, the DF_INT line will become active, causing the microprocessor 5 to receive an interrupt. The counter 81 can also be directly read by the microprocessor 5 at any time since the counter output is stored in a WC register 101 that is accessible by the microprocessor.

From the description above, it can be observed that the waypoints unit provides important advantages to a disk controller. In the situation where a read or write operation is interrupted due to an error in one of the sector transfers, the microprocessor can either directly read the contents of the counter or set the value register such that it is notified when a first set of sectors has been successfully transferred. The microprocessor can therefore determine exactly how much correct data has been transferred and only repeat the portion of the operation that was truly unsuccessful. The processor can pass the valid data to the data port while the disc formatter retrieve the remaining data. In this manner the microprocessor does not have to wait for the operation to repeat before starting to pass data from the buffer to the data port.

The waypoints unit also solves the look ahead cache problem by enabling the microprocessor to read the count value or be notified when certain points have been reached, thereby speeding up data access when the out of sequence sector request discussed above is encountered. If a sector request following an out of sequence request has been loaded onto the cache, the request can be provided from the cache thereby speeding up the operation of retrieving data from the disk. Other embodiments of the invention could include circuits in which either the ability to directly read the counter value, the ability to access the comparator output or the ability to generate an interrupt is omitted.

Although the invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. In a controller circuit which controls the operation of a peripheral storage device that stores data in sectors, the controller circuit including a transfer unit, a sector transfer monitoring circuit that facilitates the monitoring of successful sector transfers, the circuit comprising:

a counter circuit which dynamically counts a number of sectors successfully transferred by said transfer unit during a transfer operation;

at least one programmable register, said register storing an arbitrary numerical target value, wherein the numerical target value may be set at any time; and a comparison circuit which generates a signal based on a comparison of said counter circuit count and said register value.

2. The controller circuit of claim 1 wherein the controller circuit is an integrated circuit.

3. The controller circuit of claim 1 wherein the programmable register is externally programmable.

4. The controller circuit of claim 1 wherein the signal generated in response to the comparison is externally sensed.

5. The controller circuit of claim 1 wherein the controller circuit is within a hard disk controller.

6. The controller circuit of claim 1 wherein the signal generated in response to the comparison is an interrupt signal.

7. The controller circuit of claim 1 wherein the programmable register includes a readable status bit indicating the result of the comparison.

8. The controller circuit of claim 1 wherein the counter increments the count when:

during a read operation, after a successful application of all error correction protocols for the sector transferred; and during a write operation, after a successful placement of a sector on the physical platter.

9. An electronic circuit that facilitates the monitoring of successful data transfers between components of a peripheral storage device which provides access to data stored on a mass storage medium, the circuit comprising:

a transfer unit which transfers data between components of the system in response to transfer requests;

a counter which dynamically counts a number of data segments successfully transferred by said transfer unit during a transfer operation;

at least one register, said register storing an arbitrary numerical target value, wherein the numerical target value may be set at any time; and a comparison circuit which generates a signal based on a comparison of said counter circuit and said register value.

10. The circuit of claim 9 wherein said electronic circuit is a component in a controller integrated circuit.

11. The circuit of claim 9 wherein the transfer unit is a disk formatter unit that is used to pass data to and from the disk platter.

12. The circuit of claim 9 wherein the counter increments the count only after data has successfully been checked for error during a read operation.

13. The circuit of claim 9 wherein the counter increments the count only after data has successfully placed on a physical storage media during a write operation.

14. The circuit of claim 9 wherein the transfer unit is transferring data between a disk platter and a buffer.

15. A method of monitoring successful sector transfers from outside a controller IC, the method comprising the steps of:

initializing a count at the start of disk access;

storing at least one arbitrary integer target value wherein the integer target value may be set at any time;

generating a successful sector transfer signal when a sector has been successfully read or written;

dynamically incrementing said count when receiving said successful transfer signal;

comparing said count to said integer target value; and generating a signal that can be externally read in response to said comparison.

16. The method of claim 15 wherein an interrupt is generated in response to the signal from said comparison.

* * * * *